US012754099B2

(12) United States Patent
Callens et al.

(10) Patent No.: US 12,754,099 B2

(45) Date of Patent: Oct. 6, 2026

(54) OPTICAL COMBINERS FOR BINOCULAR DISPARITY DETECTION

(71) Applicant: Meta Platforms Technologies, LLC, Menlo Park, CA (US)

(72) Inventors: Michiel Koen Callens, Mountain View, CA (US); Babak Amirsolaimani, Redmond, WA (US); Jacques Gollier, Sammamish, WA (US); Sihui He, Sunnyvale, CA (US); Yitian Ding, Redmond, WA (US); Brian Wheelwright, Sammamish, WA (US); Weichuan Gao, Redmond, WA (US); Tamer Elazhary, Redmond, WA (US); Yu Shi, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 112 days.

(21) Appl. No.: 18/528,587

(22) Filed: Dec. 4, 2023

(65) Prior Publication Data

US 2024/0210274 A1 Jun. 27, 2024

Related U.S. Application Data

(60) Provisional application No. 63/434,874, filed on Dec. 22, 2022.

(51) Int. Cl.

*G01M 11/02* (2006.01)
*G02B 27/10* (2006.01)

(52) U.S. Cl.

CPC ....... *G01M 11/0242* (2013.01); *G02B 27/106* (2013.01)

(58) Field of Classification Search

CPC .......... G01M 11/0242; G01M 11/0257; G02B 27/106; G02B 2027/0129; G02B 2027/0134; G02B 30/25

See application file for complete search history.

(56) References Cited

U.S. PATENT DOCUMENTS

| | | | | |
|---|---|---|---|---|
| 9,113,043 | B1 * | 8/2015 | Kim | G06T 15/08 |
| 9,678,345 | B1 * | 6/2017 | Melzer | G02B 27/0172 |
| 11,722,654 | B1 * | 8/2023 | Sutton | H04N 13/327 348/177 |
| 2012/0019530 | A1 * | 1/2012 | Baker | G02B 30/24 345/419 |
| 2013/0162763 | A1 * | 6/2013 | Cheng | G06T 7/593 348/42 |
| 2014/0015923 | A1 * | 1/2014 | Au | G06T 7/593 348/43 |
| 2014/0055564 | A1 * | 2/2014 | Cho | H04N 13/122 348/46 |

(Continued)

*Primary Examiner* — Timothy R Newlin

(74) *Attorney, Agent, or Firm* — Greenberg Traurig, LLP

(57) ABSTRACT

Optical binocular disparity detection devices may include an optical combiner and a single image sensor. The optical combiner may include a left input for receiving a left image and a right input for receiving a right image. An output of the optical combiner may be configured to direct the left image and the right image out of the optical combiner. The single image sensor may be configured to receive and sense the left image and the right image from the output and to generate data indicative of a disparity between the left image and the right image. Various other related systems and methods are also disclosed.

20 Claims, 12 Drawing Sheets

(56) References Cited

U.S. PATENT DOCUMENTS

| | | | | |
|---|---|---|---|---|
| 2014/0375681 | A1* | 12/2014 | Robbins | G01B 11/272 345/633 |
| 2016/0231570 | A1* | 8/2016 | Levola | G02B 6/0035 |
| 2017/0295362 | A1* | 10/2017 | Travis | H04N 13/128 |
| 2018/0031476 | A1* | 2/2018 | Duer | G01N 21/7703 |
| 2018/0098056 | A1* | 4/2018 | Bohn | G02B 27/017 |
| 2019/0272802 | A1* | 9/2019 | Haba | G06F 3/147 |
| 2020/0018968 | A1* | 1/2020 | Edwin | G02B 27/0172 |
| 2020/0225479 | A1* | 7/2020 | Chi | G02F 1/011 |
| 2020/0348518 | A1* | 11/2020 | Georgiou | G02B 27/0172 |
| 2020/0363578 | A1* | 11/2020 | Choi | G02B 6/0066 |
| 2020/0368616 | A1* | 11/2020 | Delamont | H04N 13/239 |
| 2021/0003848 | A1* | 1/2021 | Choi | G02B 3/0081 |
| 2021/0174570 | A1* | 6/2021 | Bleyer | G02B 27/017 |
| 2022/0113540 | A1* | 4/2022 | Choi | G02B 6/0091 |
| 2022/0390749 | A1* | 12/2022 | Yun | G02B 5/188 |
| 2023/0273444 | A1* | 8/2023 | Demaster-Smith | H04N 13/344 349/11 |

* cited by examiner

OPTICAL COMBINERS FOR BINOCULAR DISPARITY DETECTION

CROSS REFERENCE TO RELATED APPLICATION

This application claims the benefit of U.S. Provisional Patent Application Ser. No. 63/434,874, titled "COMBINER FOR BINOCULAR DISPARITY DETECTION," filed on 22 Dec. 2022, the entire disclosure of which is incorporated herein by this reference.

BRIEF DESCRIPTION OF DRAWINGS

The accompanying drawings illustrate a number of example embodiments and are a part of the specification. Together with the following description, the drawings demonstrate and explain various principles of the present disclosure.

Figure 1:
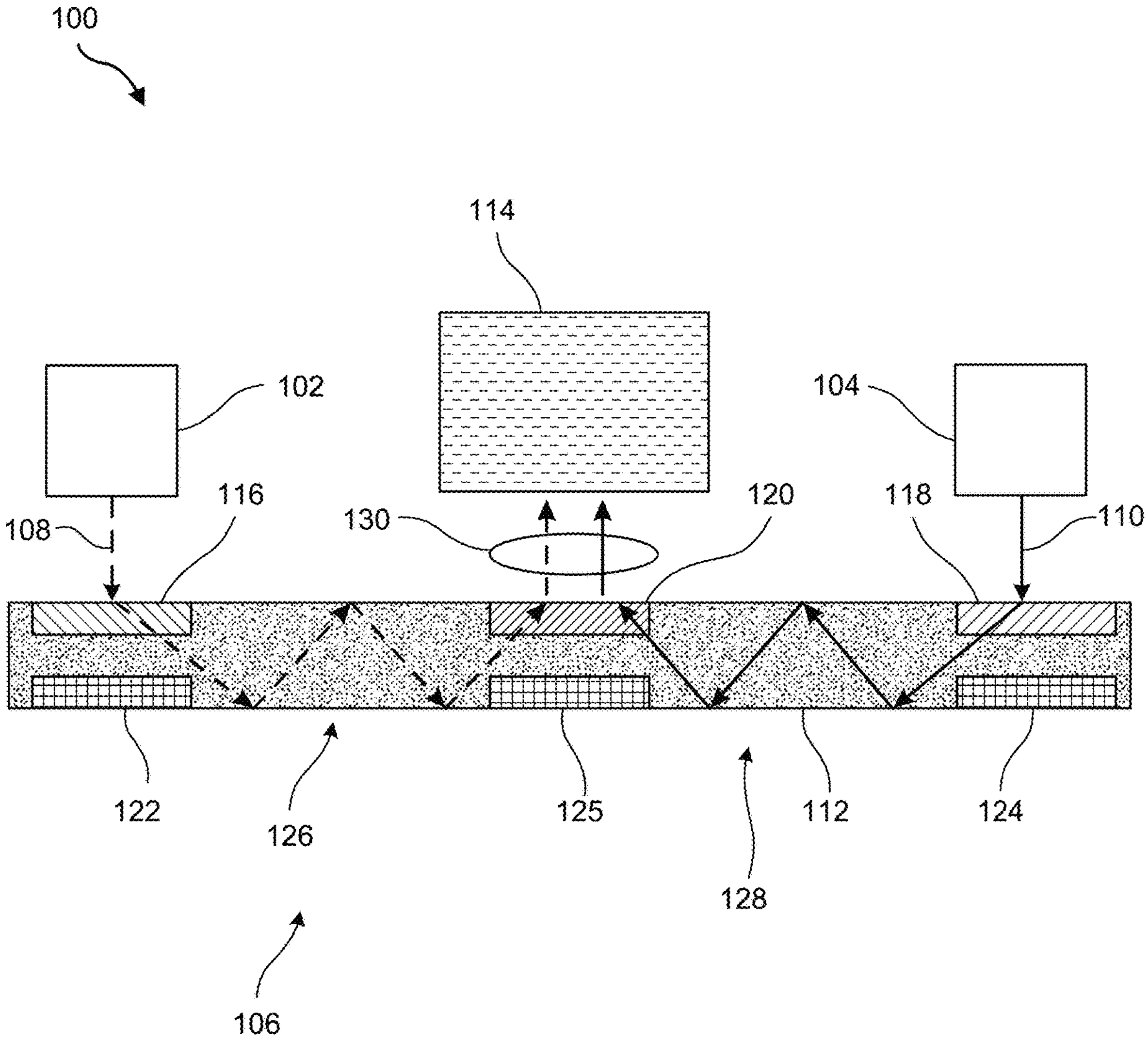
FIG. 1 is a side view of a binocular display system, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the appendices and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Binocular disparity refers to the difference between images that are simultaneously viewed from two separate eyes or image sensors and contributes to a person's ability to visually sense depth. Binocular disparity detectors have been developed for several industries and applications, such as for computer vision sensing and control of moving machines (e.g., robots, cars) and for three-dimensional (3D) display systems.

For example, artificial-reality devices (e.g., virtual-reality devices, augmented-reality devices, etc.) may include a left display for displaying a left image to a user's left eye and a right display for displaying a slightly different right image to the user's right eye. The differences between the left image and right image are intended to correlate to the differences in view of a 3D environment between the left and right eyes. However, over the lifetime of an artificial-reality device, the intended binocular disparity may not be stable and constant. Therefore, factory calibration may not be sufficient, and an active binocular disparity measurement and correction system can be helpful. Such measurement systems may include a left image sensor and a right image sensor positioned apart from each other at an approximate distance of a typical user's interpupillary distance (IPD).

For proper binocular disparity detection, a distance between and relative locations of the left and right image sensors should be stable. Mechanical instability between the left and right image sensors (e.g., due to temperature changes, deformation of the device, drop events, etc.) can result in errors in binocular disparity measurement, such as too much or not enough disparity being detected.

The disclosed concept includes using a waveguide optical combiner to direct images from left-eye and right-eye display systems to a single image sensor to determine potential disparity between the two display systems. The optical combiner could be based on one of several technologies, including various substrates (e.g., glass, silicon carbide, lithium niobate, polymers, etc.) and various grating options (e.g., volume Bragg grating (VBG), nano-imprint lithology (NIL), surface relief grating (SRG), polarization volume holographic (PVH) grating, etc.). The optical combiner may include a left input, a right input, and an output that directs light to the single image sensor. Some example implementations may also include mirrors, coatings, or additional gratings to capture stray light and/or improve performance, and/or to accommodate different grating and/or waveguide technologies.

The following will provide detailed descriptions of various example binocular display systems with reference to FIGS. 1-9B. Then, with reference to FIGS. 10 and 11, a description will be provided of example head-worn devices that may include or be implemented with the binocular display systems of the present disclosure.

FIG. 1 is a side view of a binocular display system 100, also referred to as system 100 for simplicity, according to at least one embodiment of the present disclosure. The system 100 may include a left image source 102, a right image source 104, and an optical binocular disparity detection device 106, also referred to as disparity detection device 106 for simplicity.

The left image source 102 may be configured to display a left image 108 to a user's left eye. Similarly, the right image source 104 may be configured to display a right image 110 to the user's right eye. The left and right image sources 102, 104 may have any suitable configuration for displaying images. For example, each of the left and right image sources 102, 104 may be implemented as a projector, such as a liquid crystal display (LCD) projector, a digital light processing (DLP) projector, a liquid crystal on silicon (LCOS) projector, a light emitting diode (LED) projector, a laser projector, an output of a waveguide, an output of a mirror, etc.

The disparity detection device 106 may include an optical combiner 112 and a single image sensor 114. The optical combiner 112 may include a left input 116 for receiving the left image 108 and a right input 118 for receiving the right image 110. The optical combiner 112 may also include an output 120 (e.g., a single output) for directing the left image 108 and the right image 110 out of the optical combiner 112 and toward the single image sensor 114.

The optical combiner 112 may be configured to transmit the left image 108 from the left input 116 and the right image 110 from the right input 118 to the output 120. For example, in some embodiments the optical combiner 112 may be or include a waveguide combiner. In this case, the left input 116 and the right input 118 may respectively include a left input grating and a right input grating, and the output 120 may include an output grating. For example, the left input 116, right input 118, and output 120 may be implemented as a volume Bragg grating (VBG), surface relief grating (SRG), polarization volume holographic (PVH) grating, or the like.

The receipt, transmission, and detection of the left image 108 and right image 110 by the system 100 may include the entire left image 108 and entire right image 110 displayed to the user or a portion of the entire left image 108 (e.g., one or more left chief rays) and a portion of the entire right image 110 (e.g., one or more right chief rays) displayed to the user. Accordingly, throughout the specification, the phrases "left image" and "right image" may refer to portions of a generated and displayed image or the whole generated and displayed image.

In some examples, the optical combiner 112 may include a left light director 122 on an opposing side of the optical combiner 112 from the left input 116 and a right light director 124 on an opposing side of the optical combiner 112 from the right input 118. The optical combiner 112 may also include an output light director 125 on an opposing side of the optical combiner 112 from the output 120. The left light director 122, the right light director 124, and the output light director 125 may each include a mirror and/or a grating to direct the left image 108 and/or right image 110 toward the output 120.

The optical combiner 112 may also include a left internal reflection (e.g., total internal reflection, or TIR) region 126 configured for transmitting the left image 108 from the left input 116 toward the output 120. A right internal reflection (e.g., TIR) region 128 may be configured for transmitting the right image 110 from the right input 118 toward the output 120. For example, each of the left internal reflection region 126 and the right internal reflection region 128 may be formed of a material such as glass, silicon carbide, lithium niobate, polymer, or the like.

The single image sensor 114 may be configured to receive and sense the left image 108 and the right image 110 from the output 120 and to generate data indicative of a disparity between the left image 108 and the right image 110. By way of example and not limitation, the single image sensor 114 may include a single array of light detection pixels. For example, the single image sensor 114 may include at least one of a single charge-coupled device (CCD) sensor and/or a single complementary metal-oxide-semiconductor (CMOS) sensor. In some examples, an optical lens 130 may be positioned between the output 120 and the single image sensor 114, such as for focusing the left image 108 and/or right image 110 for detection by the single image sensor 114.

In some examples, the left image 108 may reach and be detected by a first portion of the single image sensor 114 and the right image 110 may reach and be detected by a second portion of the single image sensor 114. Data from the two portions of the single image sensor 114 may be rectified and compared to identify differences (e.g., pixel differences, location differences, etc.) between the detected left image 108 and right image 110. For example, the data from the two portions of the single image sensor 114 may be compared to identify matching image features and then qualities (e.g., pixel location) of the matching image features may be compared.

In additional examples, frames of the left image 108 may be detected at a first time and frames from the right image 110 may be detected at a different time. The respective frames may be rectified and compared to identify differences between the detected left image 108 and right image 110.

In some examples, the disparity detection device 106 may be utilized without the presence of the left image source 102 and right image source 104. For example, the disparity detection device 106 may be implemented as a depth sensor to determine the distance of real-world objects from the disparity detection device 106. In this case, the left image 108 and the right image 110 may represent views of the real world as respectively seen by the left input 116 and the right input 118. In some examples, the left input 116 and the right input 118 may be positioned at a distance from each other that corresponds to a user's IPD, such as at an average IPD of expected users.

As illustrated in FIG. 1, the output 120 may be a central output that is centrally located between the left input 116 and right input 118. However, the present disclosure is not so limited. For example, in additional examples, the output 120 may be located between, but not necessarily centrally between, the left input 116 and right input 118. In other examples, the output 120 may be located laterally away from a straight line extending from the left input 116 to the right input 118. In yet further examples, the output 120 may be located outside of a space between the left input 116 and right input 118, such as to the left of the left input 116 or to the right of the right input 118.

In some examples, relational terms, such as "first," "second," "left," "right," etc., may be used for clarity and convenience in understanding the disclosure and accompanying drawings and do not connote or depend on any specific preference, orientation, or order, except where the context clearly indicates otherwise.

Figure 2:
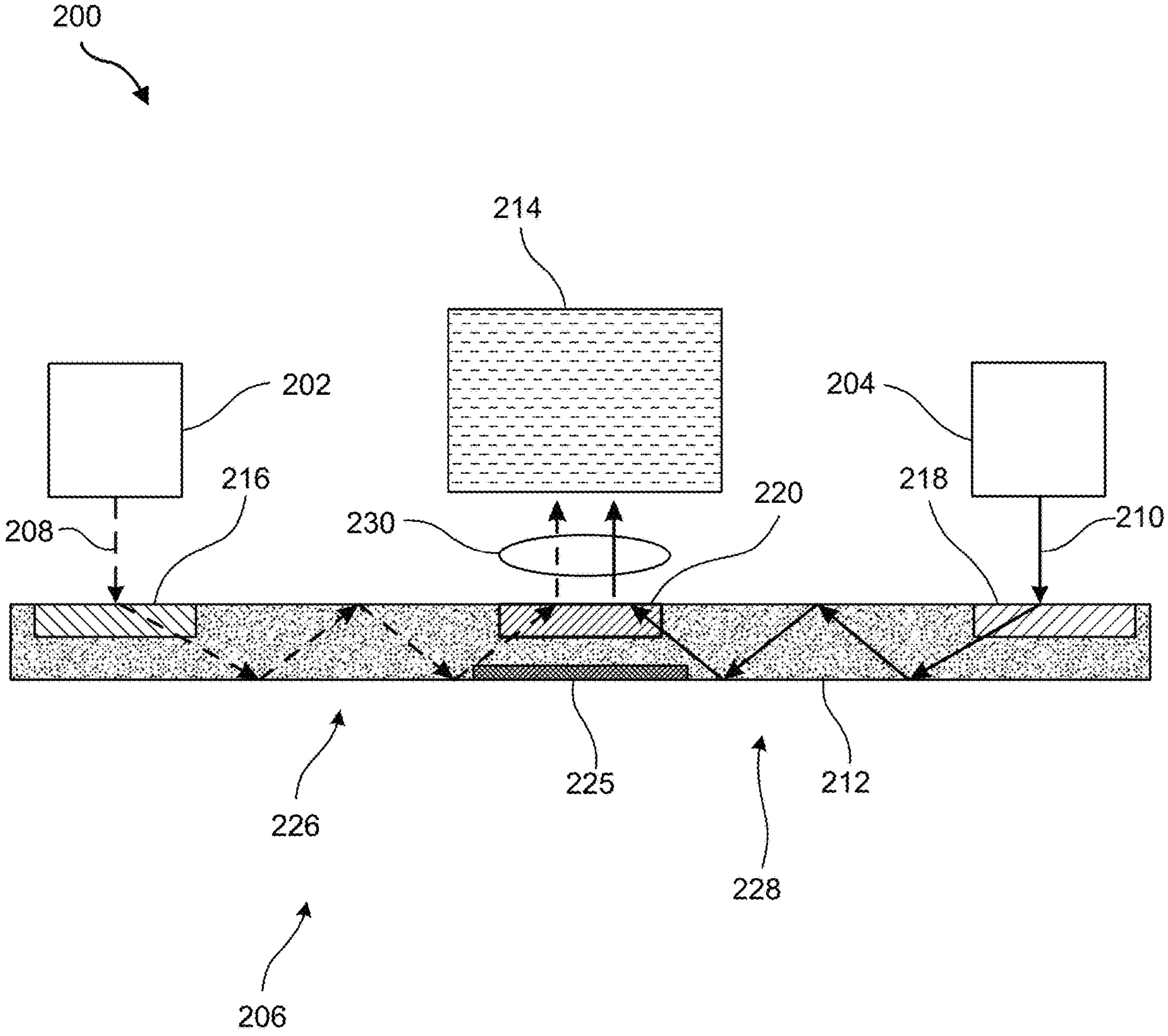
FIG. 2 is a side view of a binocular display system, according to at least one additional embodiment of the present disclosure.

FIG. 2 is a side view of a binocular display system 200, also referred to as system 200 for simplicity, according to at least one additional embodiment of the present disclosure. The system 200 may include a left image source 202, a right image source 204, and a disparity detection device 206. The left image source 202 may be configured to generate a left image 208 and the right image source 204 may be configured to generate a right image 210.

The disparity detection device 206 may include an optical combiner 212 configured to receive and transmit the left image 208 and right image 210 to a single image sensor 214. For example, the optical combiner 212 may include a left input 216 (e.g., a left input grating) for receiving the left image 208 and a right input 218 (e.g., a right input grating) for receiving the right image 210. The optical combiner 212 may also include an output 220 (e.g., an output grating) for transmitting the left image 208 and right image 210 out of the optical combiner and to the single image sensor 214. A left internal reflection region 226 of the optical combiner 212 may be configured to transmit the left image 208 from the left input 216 to the output 220. A right internal reflection region 228 of the optical combiner 212 may be configured to transmit the right image 210 from the right input 218 to the output 220. In some examples, an optical lens 230 may be positioned between the output 220 and the single image sensor 214, such as for focusing the left image 208 and/or right image 210 for detection by the single image sensor 214.

As illustrated in FIG. 2, the optical combiner 212 may also include an output light director 225, such as an optical grating and/or a mirror. The output light director 225 may be positioned on an opposite side of the optical combiner 212 from the output 220. In this example, there is no left light director opposite the left input 216 and no right light director opposite the right input 218.

Figure 3:
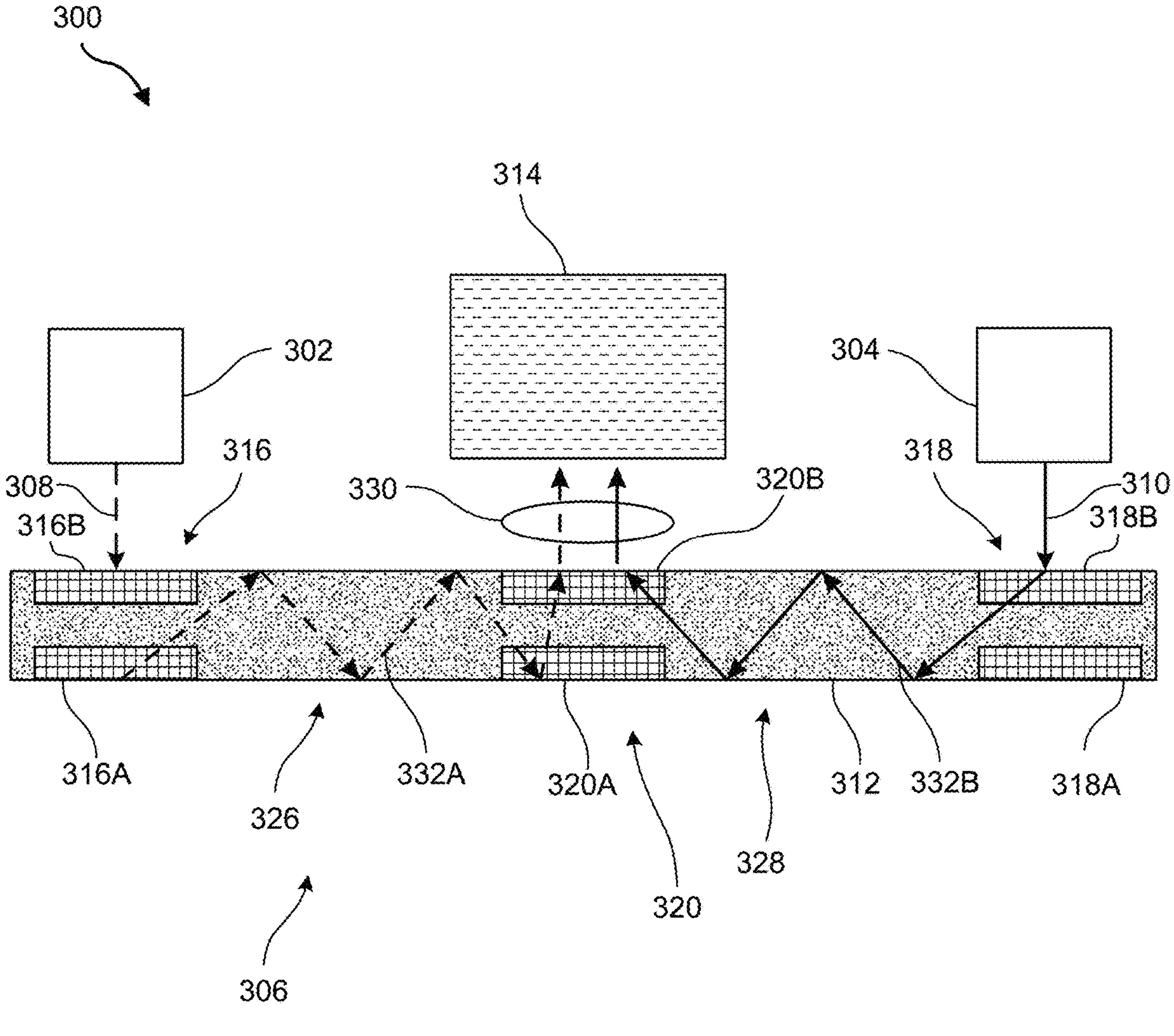
FIG. 3 is a side view of a binocular display system, according to at least one further embodiment of the present disclosure.

FIG. 3 is a side view of a binocular display system 300, also referred to as system 300 for simplicity, according to at least one further embodiment of the present disclosure. The system 300 may include a left image source 302, a right image source 304, and a disparity detection device 306. The left image source 302 may be configured to generate a left image 308 and the right image source 304 may be configured to generate a right image 310.

The disparity detection device 306 may include an optical combiner 312 configured to receive and transmit the left image 308 and right image 310 to a single image sensor 314. For example, the optical combiner 312 may include a left input 316 (e.g., a left input grating) for receiving the left image 308 and a right input 318 (e.g., a right input grating) for receiving the right image 310. The optical combiner 312 may also include an output 320 (e.g., an output grating) for transmitting the left image 308 and right image 310 out of the optical combiner and to the single image sensor 314. A left internal reflection region 326 of the optical combiner 312 may be configured to transmit the left image 308 from the left input 316 to the output 320. A right internal reflection region 328 of the optical combiner 312 may be configured to transmit the right image 310 from the right input 318 to the output 320. In some examples, an optical lens 330 may be positioned between the output 320 and the single image sensor 314, such as for focusing the left image 308 and/or right image 310 for detection by the single image sensor 314.

As illustrated in FIG. 3, the optical combiner 312 may be configured for transmitting light of multiple different polarities to the output 320. For example, the left input 316 may include a first left input grating 316A of a first polarization (e.g., for transmitting light of the first polarization 332A) and a second left input grating 316B of a second polarization (e.g., for transmitting light of the second polarization 332B) that is different from the first polarization. Similarly, the right input 318 may include a first right input grating 318A of the first polarization and a second right input grating 318B of the second polarization. The output 320 may also include a first output grating 320A of the first polarization and a second output grating 320B of the second polarization. In some examples, the gratings of the disparity detection device 306 may be PVH gratings, which are typically polarization-dependent.

For simplicity and clarity, in FIG. 3 the left side of the disparity detection device 306 is shown as transmitting the light of the first polarization 332A and the right side is shown as transmitting the light of the second polarization 332B. However, both sides of the disparity detection device 306 may be configured to pass light of both polarizations toward the single image sensor 314.

For example, as the light of the first polarization 332A enters the disparity detection device 306 at the left input 316 and right input 318, the first left input grating 316A and the first right input grating 318A may direct the light toward the output 320. The first output grating 320A may direct the light of the first polarization 332A toward the single image sensor 314. As light of the second polarization 332B enters the disparity detection device 306 at the left input 316 and right input 318, the second left input grating 316B and the second right input grating 318B may direct the light toward the output 320. The second output grating 320B may direct the light of the second polarization 332B toward the single image sensor 314.

Figure 4:
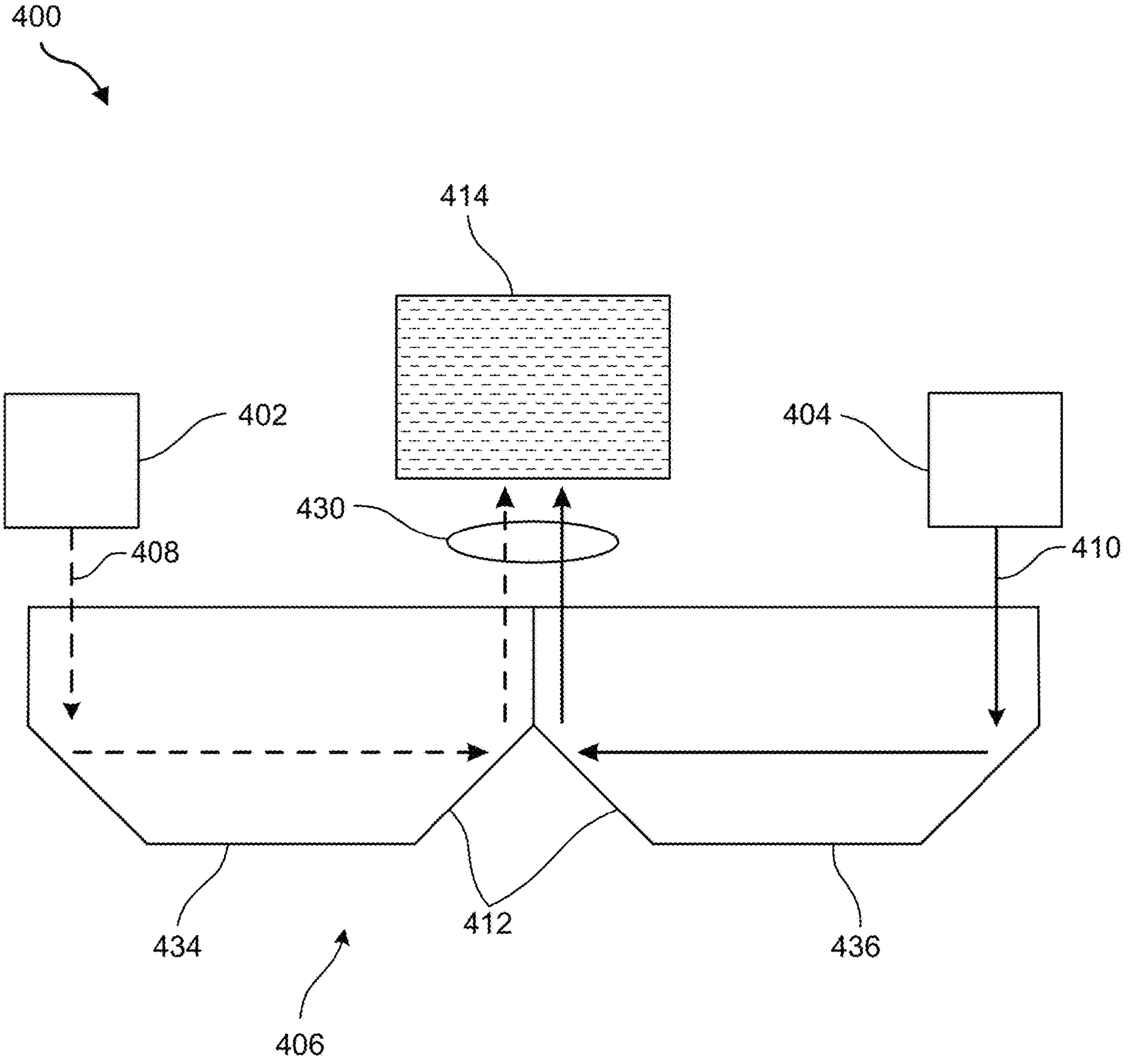
FIG. 4 is a side view of a binocular display system, according to at least one additional embodiment of the present disclosure.

FIG. 4 is a side view of a binocular display system 400, also referred to as system 400 for simplicity, according to at least one additional embodiment of the present disclosure. As explained next, the system 400 may include one or more prisms rather than a waveguide.

In some respects, the system 400 may be similar to the systems 100, 200, 300 of FIGS. 1-3. For example, the system 400 may include a left image source 402 for generating a left image 408 and a right image source 404 for generating a right image 410. A disparity detection device 406 may include an optical combiner 412 for transmitting the left image 408 and right image 410 to a single image sensor 414. An optical lens 430 may be positioned between the optical combiner 412 and the single image sensor 414, such as for focusing the left image 408 and/or right image 410 for detection by the single image sensor 414.

As shown in FIG. 4, the optical combiner 412 may include one or more prisms, such as a left prism 434 and a right prism 436. The left prism 434 may be positioned and configured to transmit the left image 408 toward the single image sensor 414 and the right prism 436 may be positioned and configured to transmit the right image 410 toward the single image sensor 414 for detection and analysis (e.g., disparity detection analysis).

Figure 5:
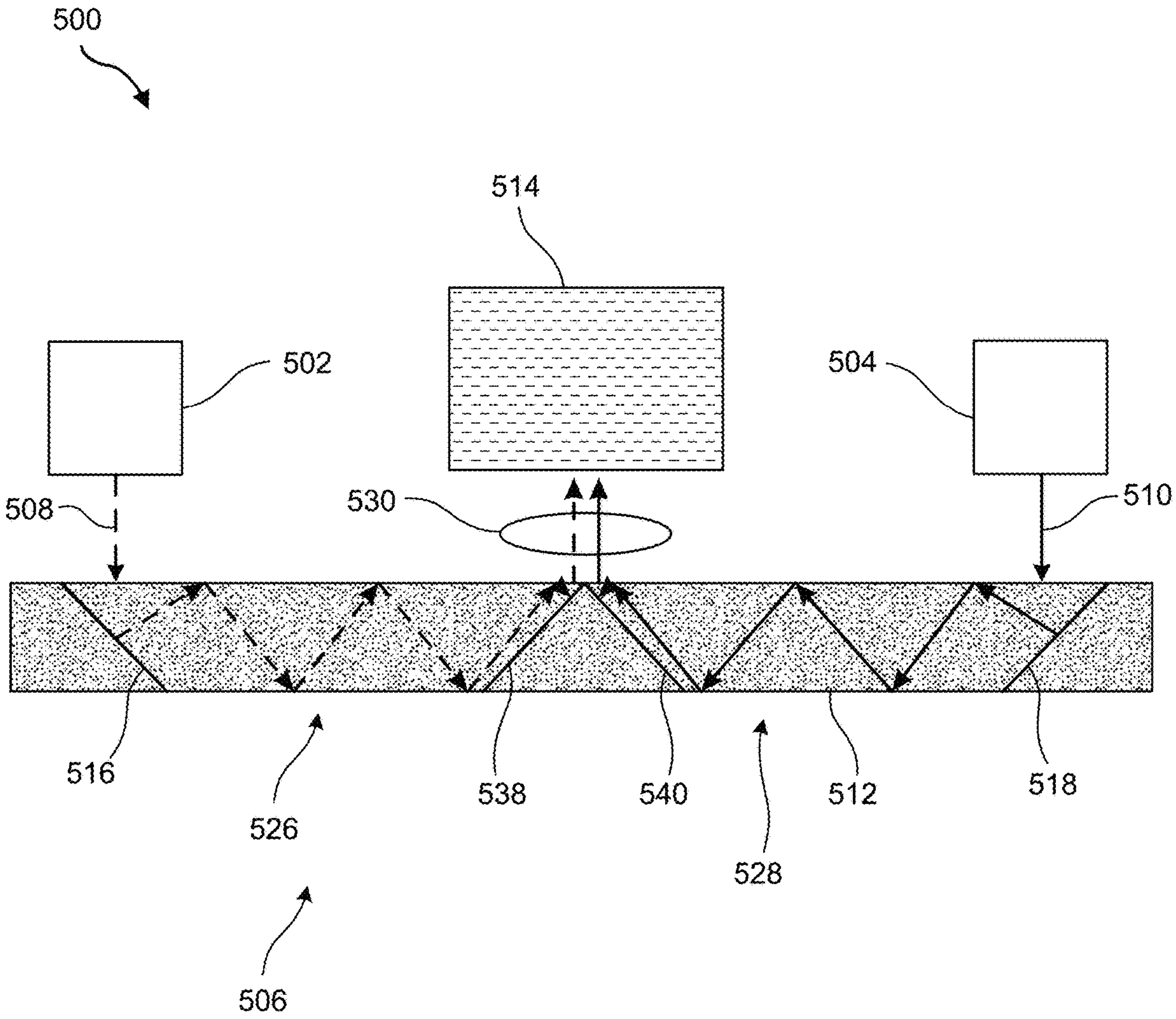
FIG. 5 is a side view of a binocular display system, according to at least one other embodiment of the present disclosure.

FIG. 5 is a side view of a binocular display system 500, also referred to as system 500 for simplicity, according to at least one other embodiment of the present disclosure. In some respects, the system 500 may be similar to the systems 100, 200, 300 of FIGS. 1-3. For example, the system 500 may include a left image source 502 for generating a left image 508 and a right image source 504 for generating a right image 510. A disparity detection device 506 may include an optical combiner 512 for transmitting the left image 508 and right image 510 to a single image sensor 514. An optical lens 530 may be positioned between the optical combiner 512 and the single image sensor 514, such as for focusing the left image 508 and/or right image 510 for detection by the single image sensor 514.

As shown in FIG. 5, the optical combiner 512 may include a reflective waveguide with mirror elements therein. For example, the optical combiner 512 may include a left input mirror 516, a left output mirror 538, a right input mirror 518, and a right output mirror 540. The left input mirror 516 may be oriented to transmit the left image 508 through a left internal reflection region 526 to the left output mirror 538. Likewise, the right input mirror 518 may be oriented to transmit the right image 510 through a right internal reflection region 528 to the right output mirror 540. The left output mirror 538 and the right output mirror 540 may be respectively oriented to direct the left image 508 and right image 510 toward the single image sensor 514.

As illustrated in FIG. 5, the left output mirror 538 and right output mirror 540 may be arranged in the shape of an inverted "V" when viewed from a side. In this case, the left image 508 and the right image 510 may be directed to two respective different portions (e.g., a left portion and a right portion) of the single image sensor 514 to be detected and analyzed.

Figure 6:
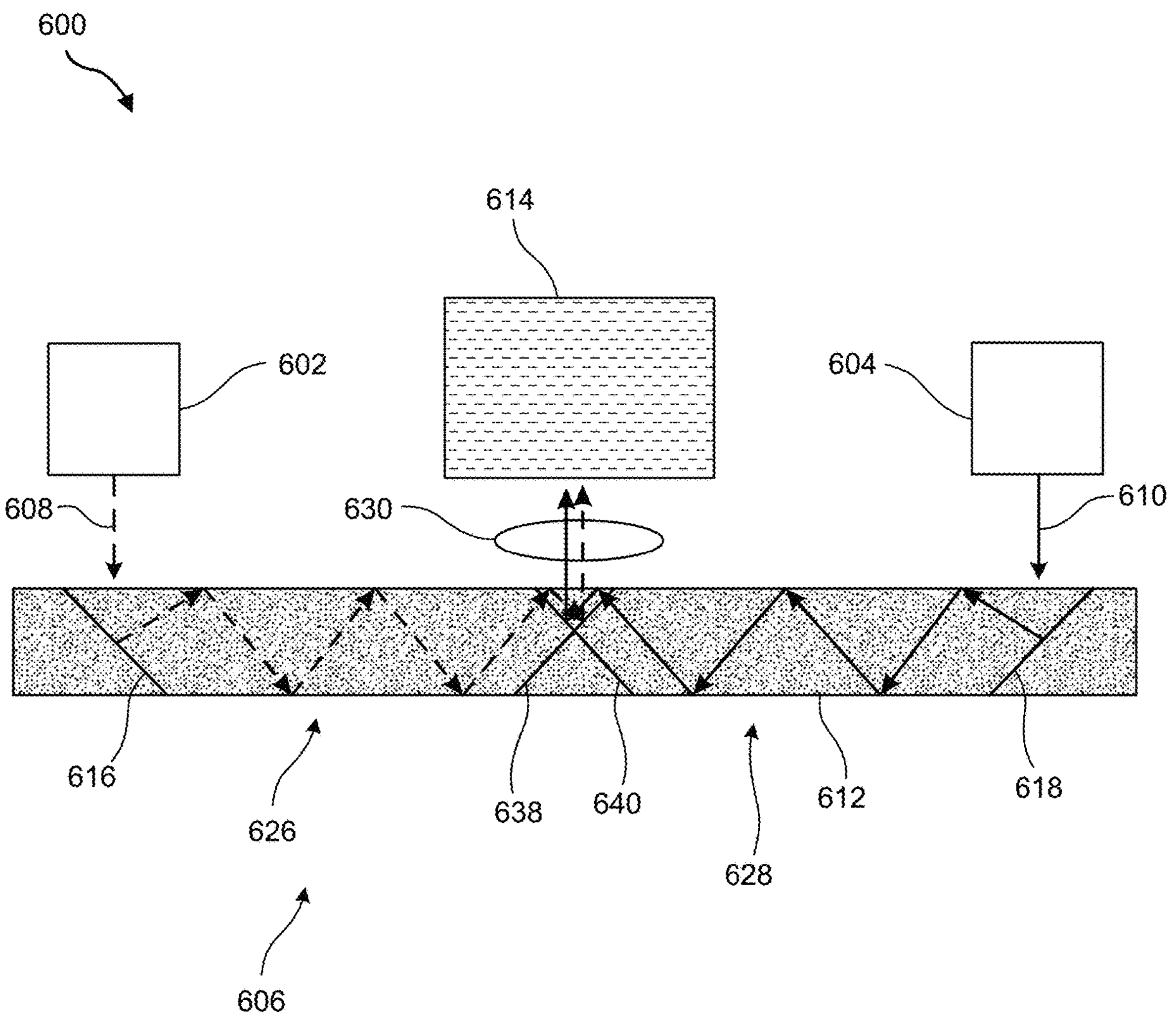
FIG. 6 is a side view of a binocular display system, according to at least one additional embodiment of the present disclosure.

FIG. 6 is a side view of a binocular display system 600, also referred to as system 600 for simplicity, according to at least one additional embodiment of the present disclosure. In some respects, the system 600 may be similar to the system 500 of FIG. 5. For example, the system 600 may include a left image source 602 for generating a left image 608 and a right image source 604 for generating a right image 610. A disparity detection device 606 may include an optical combiner 612 for transmitting the left image 608 and right image 610 to a single image sensor 614. An optical lens 630 may be positioned between the optical combiner 612 and the single image sensor 614, such as for focusing the left image 608 and/or right image 610 for detection by the single image sensor 614. The optical combiner 612 may include a reflective waveguide with mirror elements therein. For example, the optical combiner 612 may include a left input mirror 616, a left output mirror 638, a right input mirror 618, and a right output mirror 640. The left input mirror 616 may be oriented to transmit the left image 608 through a left internal reflection region 626 to the left output mirror 638. Likewise, the right input mirror 618 may be oriented to transmit the right image 610 through a right internal reflection region 628 to the right output mirror 640. The left output mirror 638 and the right output mirror 640 may be respectively oriented to direct the left image 608 and right image 610 toward the single image sensor 614.

As illustrated in FIG. 6, the left output mirror 638 and right output mirror 640 may be arranged in the shape of an "X" when viewed from a side. In this case, the left image 608 and the right image 610 may be at least partially overlapped by the left output mirror 638 and right output mirror 640 to be detected in a common region of the single image sensor 614.

Figure 7:
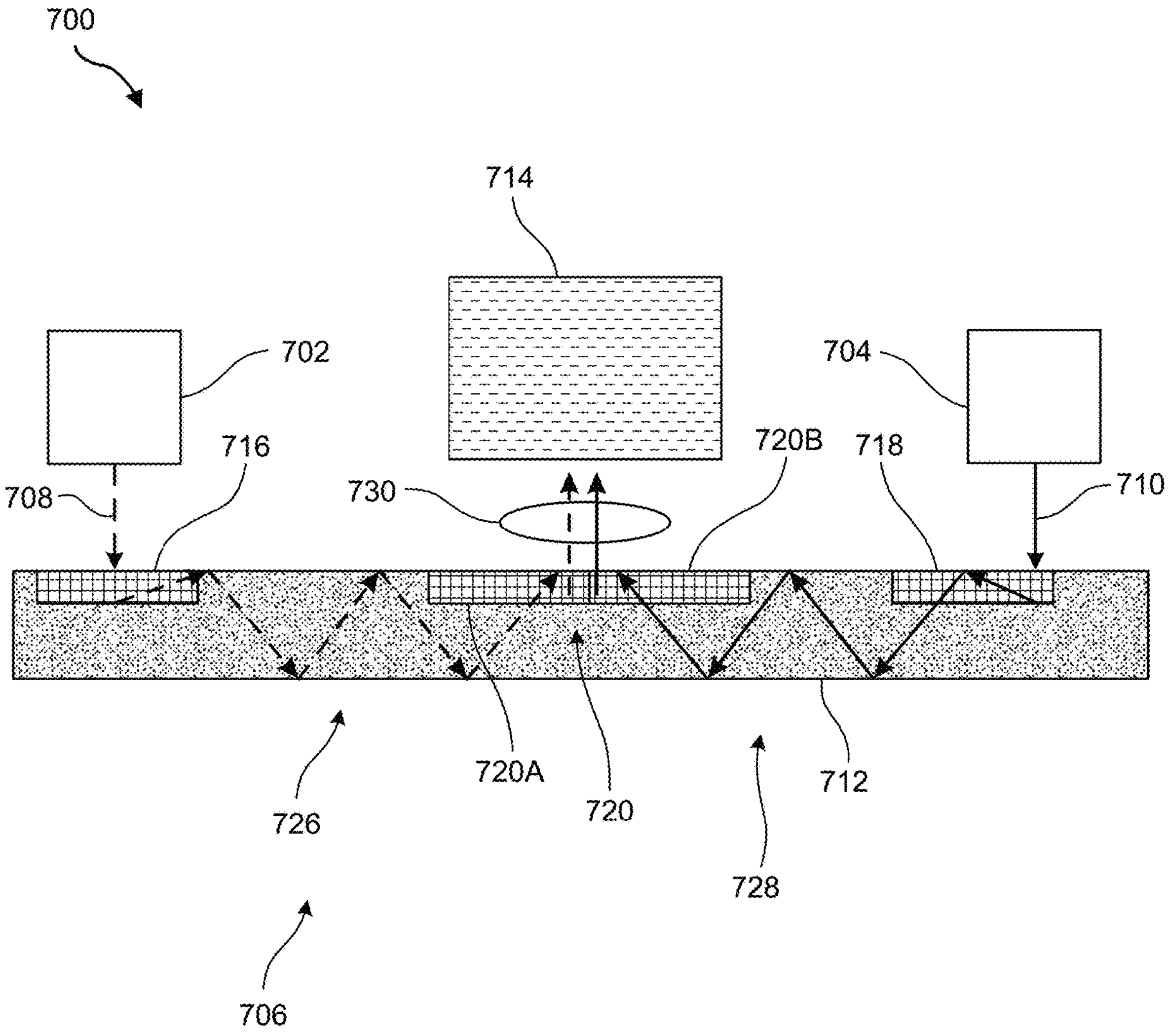
FIG. 7 is a side view of a binocular display system, according to at least one further embodiment of the present disclosure.

FIG. 7 is a side view of a binocular display system 700, also referred to as system 700 for simplicity, according to at least one further embodiment of the present disclosure.

In some respects, the system 700 may be similar to the systems 100, 200, 300 of FIGS. 1-3. For example, the system 700 may include a left image source 702 for generating a left image 708 and a right image source 704 for generating a right image 710. A disparity detection device 706 may include an optical combiner 712 for transmitting the left image 708 and right image 710 to a single image sensor 714. An optical lens 730 may be positioned between the optical combiner 712 and the single image sensor 714, such as for focusing the left image 708 and/or right image 710 for detection by the single image sensor 714. The optical combiner 712 may include a left input 716 for receiving the left image 708 and a right input 718 for receiving the right image 710. An output 720 may be located and configured for directing the left image 708 and right image 710 out of the optical combiner 712 and toward the single image sensor 714 for disparity detection. A left internal reflection region 726 may transmit the left image 708 from the left input 716 toward the output 720 and a right internal reflection region 728 may transmit the right image 710 from the right input 718 toward the output.

As shown in FIG. 7, the left input 716 may be a left input grating, the right input 718 may be a right input grating, and the output 720 may include a left output grating 720A and a right output grating 720B. By way of example and not limitation, these gratings of the optical combiner 712 of FIG. 7 may be volume Bragg gratings (VBGs).

Figure 8A:
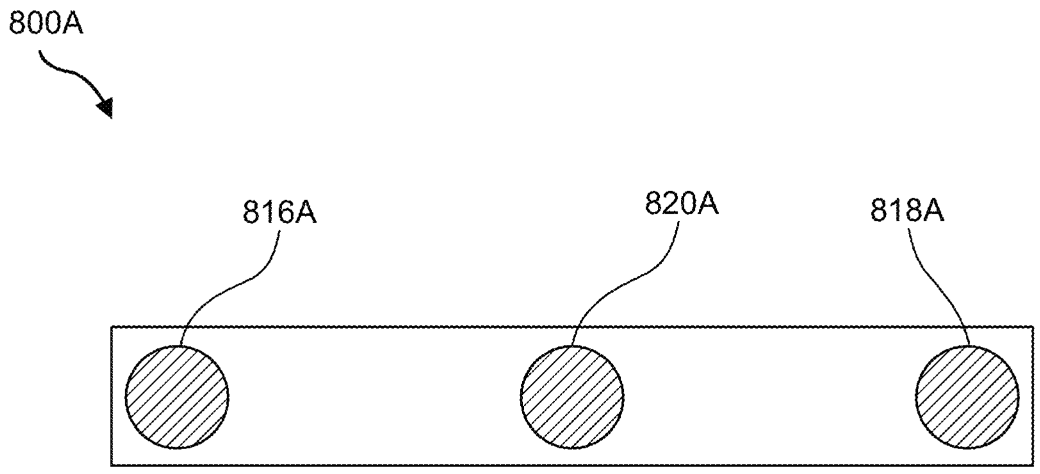
FIGS. 8A and 8B are plan views of optical combiners showing different respective grating shapes, according to embodiments of the present disclosure.
Figure 8B:
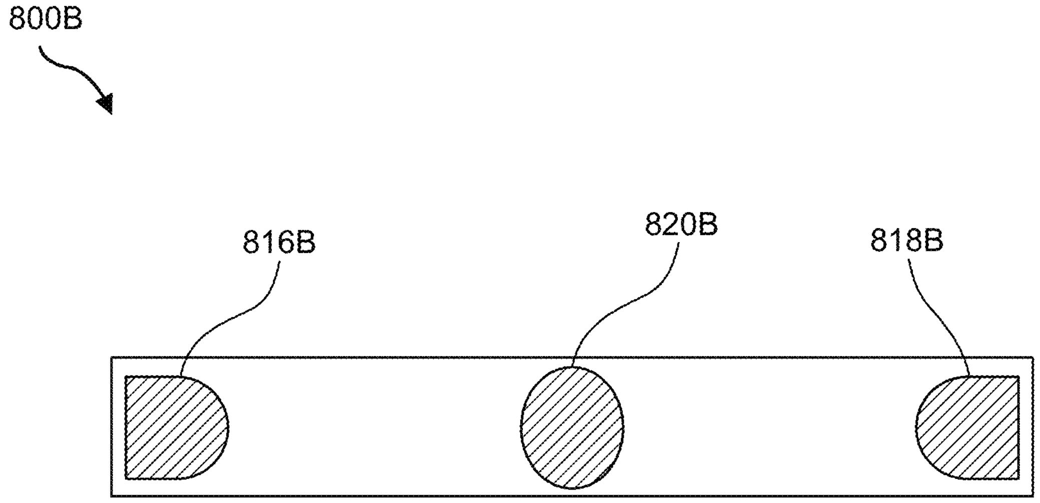

FIGS. 8A and 8B are plan views of optical combiners 800A and 800B showing different respective grating shapes, according to embodiments of the present disclosure. The optical combiners 800A and 800B may represent any of the optical combiners 112, 212, 312, 712 discussed above that may use gratings as inputs.

As shown in FIG. 8A, the optical combiner 800A may include a left input grating 816A, a right input grating 818A, and an output grating 820A, each of which may have a substantially circular shape. As shown in FIG. 8B, alternatively, the optical combiner 800B may include a left input grating 816B having the shape of a D, a right input grating 818B having the shape of a D (e.g., a backwards D), and an output grating 820B having an oval shape.

FIGS. 8A and 8B illustrate that the input and output gratings of optical combiners of the present disclosure may have a variety of shapes. Additional grating shapes other than circular, D-shaped, or oval may also be used. The selection of the grating shapes may be based on how much light will be passed to the single image sensor, the shape of the displayed left image and right image, a portion of the left image and right image to be used for disparity detection, available area for the gratings, lens configurations, optical efficiency, manufacturing efficiency, and/or other potential considerations.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

Figure 9A:
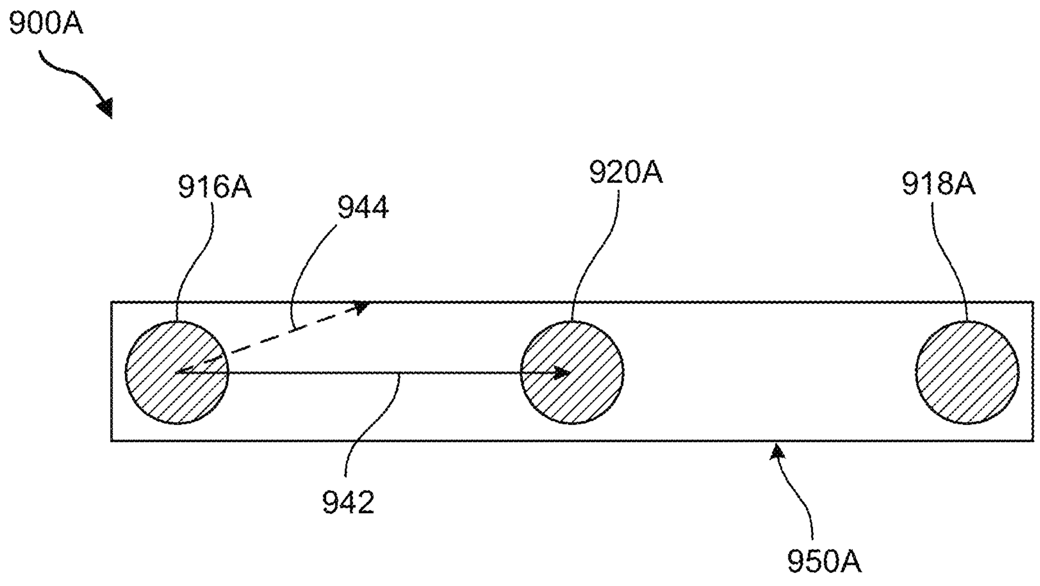
FIGS. 9A and 9B are side views of optical combiners showing different respective coating options, according to embodiments of the present disclosure.
Figure 9B:
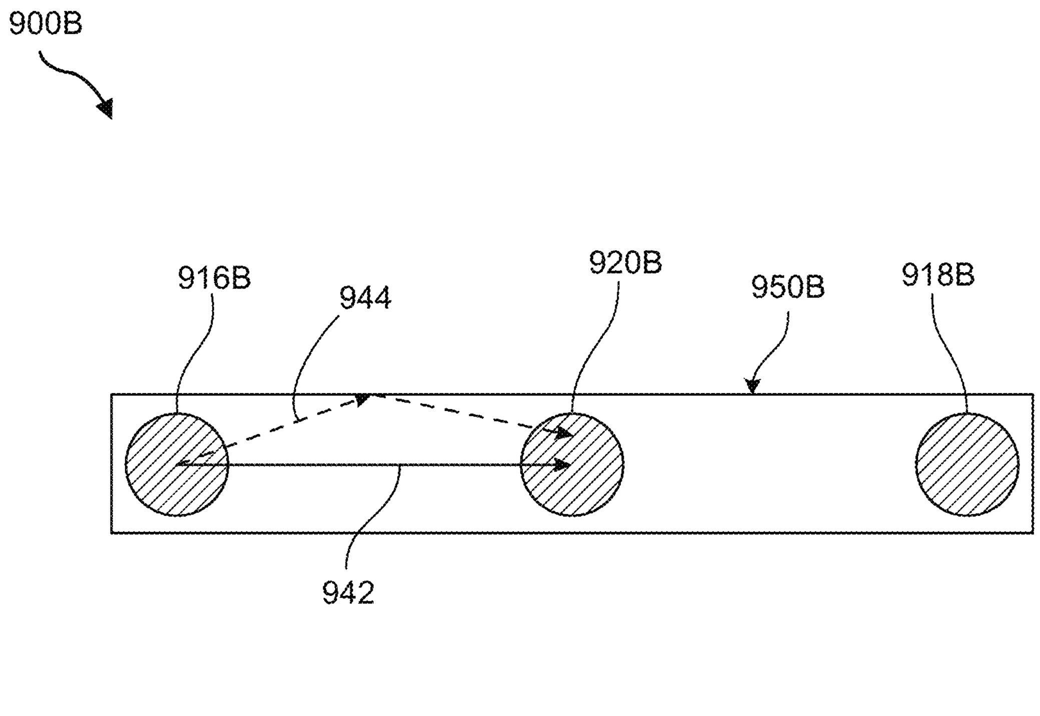

FIGS. 9A and 9B are side views of optical combiners 900A and 900B showing different respective coating options, according to embodiments of the present disclosure.

The optical combiner 900A of FIG. 9A may include a left input grating 916A, a right input grating 918A, and an output grating 920A. Light entering the left input grating 916A and the right input grating 918A my include on-axis beams 942 (e.g., light beams that are oriented directly toward the output grating 920A) and off-axis beams 944 (e.g., light beams that are oriented toward sides of the optical combiner 900A before reaching the output grating 920A). Sides of the optical combiner 900A may be coated in a light-absorbing coating 950A or other light-absorbing surface treatment. Thus, any on-axis beams 942 may reach the output grating 920A, but any off-axis beams 944 may be absorbed by the light-absorbing coating 950A.

The optical combiner 900B of FIG. 9B may likewise include a left input grating 916B, a right input grating 918A, and an output grating 920B. Light entering the left input grating 916B and the right input grating 918B my include on-axis beams and off-axis beams 944. Sides of the optical combiner 900B may be coated in a light-reflecting coating 950B or other light-reflecting surface treatment. For example, the sides of the optical combiner 900B may be polished or mirrored to increase internal reflection. Thus, any on-axis beams 942 may reach the output grating 920B and at least some off-axis beams 944 that reflect off the light-reflecting coating 950B may also reach the output grating 920B. The light-reflecting coating 950B may, therefore, increase a vertical field of view (FOV) of the optical combiner 900B of FIG. 9B compared to the optical combiner 900A of FIG. 9A.

Figure 10:
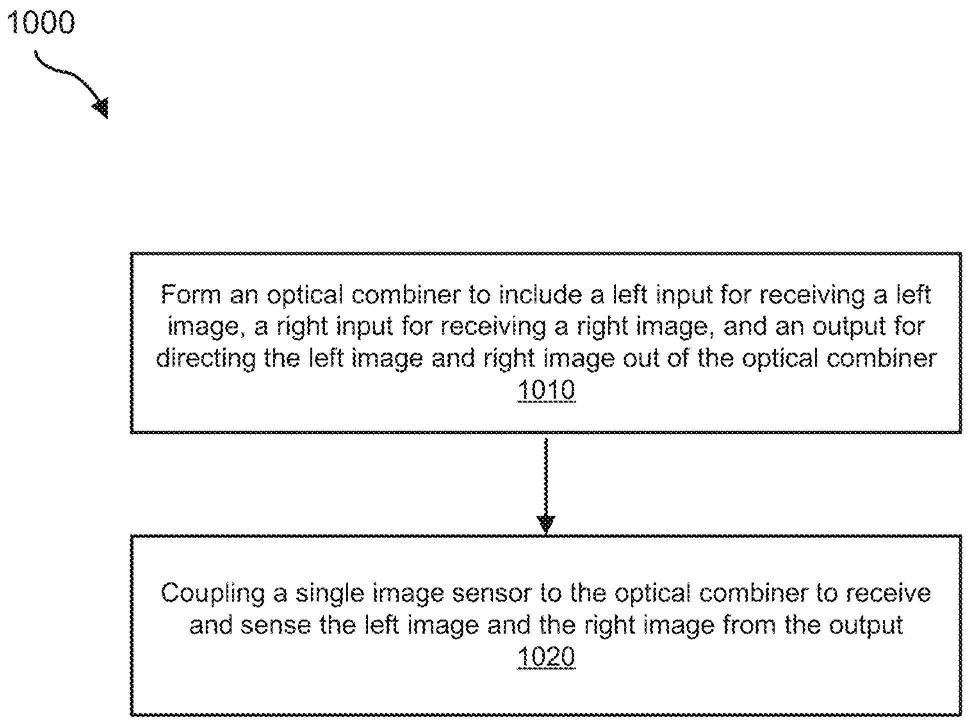
FIG. 10 is a flow diagram illustrating a method 1000 of fabricating an optical binocular disparity detection device, according to at least one embodiment of the present disclosure.

FIG. 10 is a flow diagram illustrating a method 1000 of fabricating an optical binocular disparity detection device, according to at least one embodiment of the present disclosure. At operation 1010, an optical combiner may be formed. The optical combiner may be formed to include a left input (e.g., a left input grating) for receiving a left image, a right input (e.g., a right input grating) for receiving a right image, and an output (e.g., an output grating) for directing the left image and right image out of the optical combiner. The optical combiner may also include a left internal reflection (e.g., TIR) region for transmitting the left image from the left input to the output and a right internal reflection (e.g., TIR) region for transmitting the right image from the right input to the output. In some examples, the optical combiner may be or include a waveguide combiner.

At operation 1020, a single image sensor may be coupled to the optical combiner to receive and sense the left image and the right image from the output. By way of example and not limitation, the single image sensor may be a single CCD sensor or a single CMOS sensor. In some embodiments, a lens may be positioned between the output and the single image sensor for focusing the left image and/or right image for detection by the single image sensor.

Accordingly, the present disclosure may include binocular display systems and disparity detection devices that include a single image sensor for obtaining optical data for disparity detection. By utilizing a single image sensor (e.g., as opposed to more than one image sensor), electrical power requirements may be reduced and reliability may be improved. For example, such systems with a single image sensor may not be susceptible to relative movement between two image sensors (e.g., due to drop events, temperature changes, wear and tear, etc.) that could result in errors in disparity detection.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
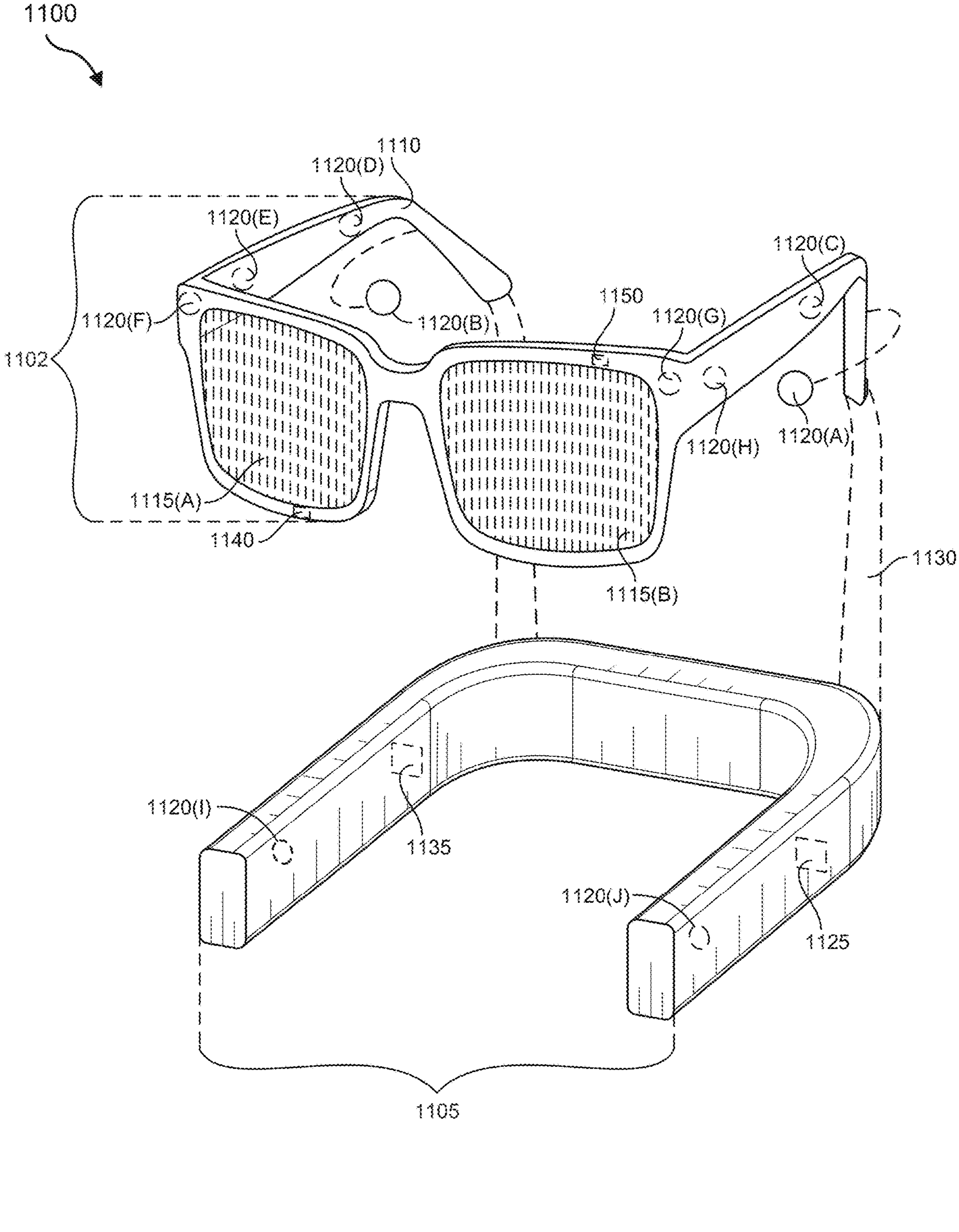
FIG. 11 is an illustration of example augmented-reality glasses that may be used in connection with embodiments of this disclosure.
Figure 12:
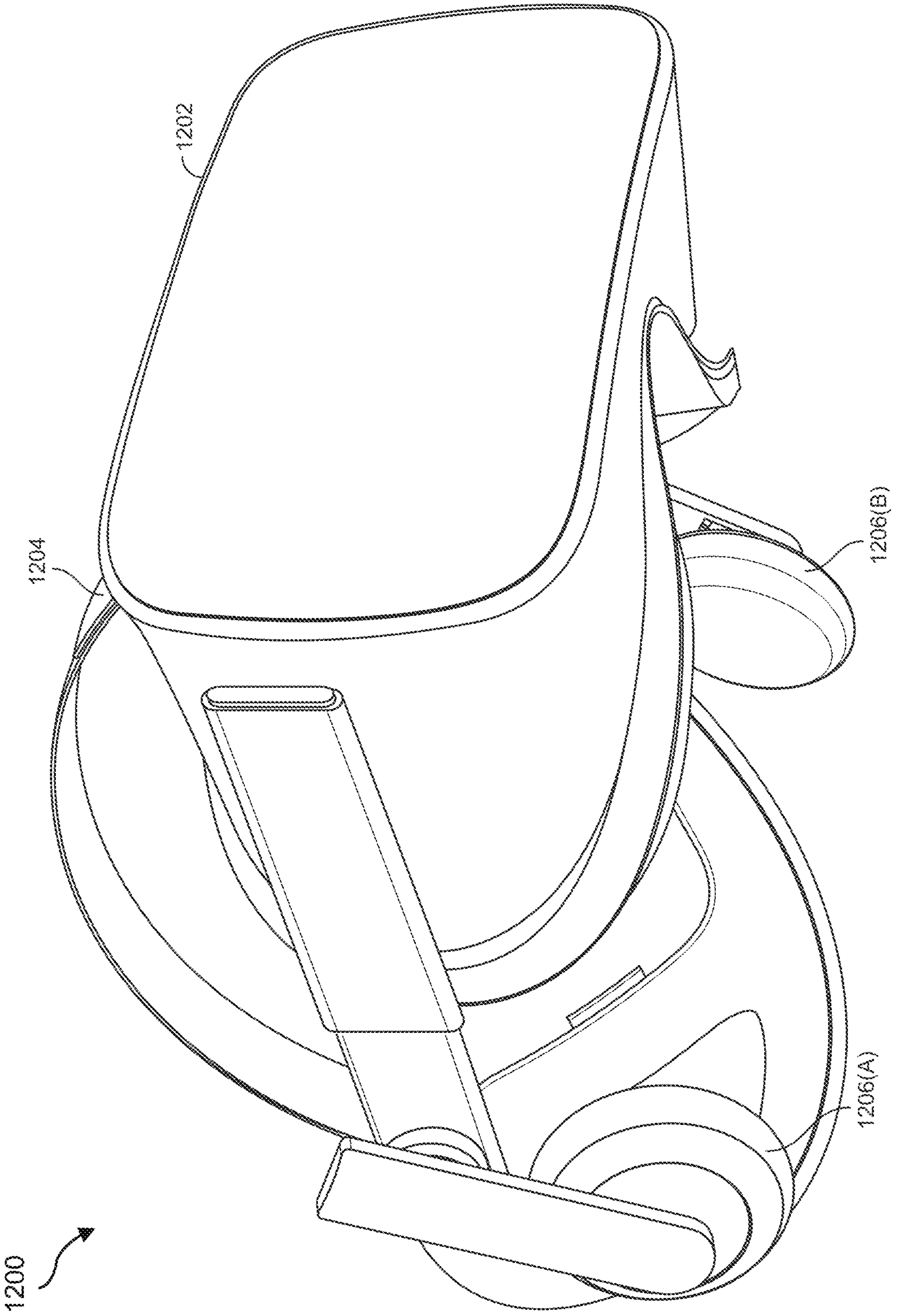
FIG. 12 is an illustration of an example virtual-reality headset that may be used in connection with embodiments of this disclosure.

Turning to FIG. 11, the augmented-reality system 1100 may include an eyewear device 1102 with a frame 1110 configured to hold a left display device 1115(A) and a right display device 1115(B) in front of a user's eyes. The display devices 1115(A) and 1115(B) may act together or independently to present an image or series of images to a user. While the augmented-reality system 1100 includes two displays, embodiments of this disclosure may be implemented in augmented-reality systems with a single NED or more than two NEDs.

In some embodiments, the augmented-reality system 1100 may include one or more sensors, such as sensor 1140. The sensor 1140 may generate measurement signals in response to motion of the augmented-reality system 1100 and may be located on substantially any portion of the frame 1110. The sensor 1140 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1100 may or may not include the sensor 1140 or may include more than one sensor. In embodiments in which the sensor 1140 includes an IMU, the IMU may generate calibration data based on measurement signals from the sensor 1140. Examples of the sensor 1140 may include, without limitation, accelerometers, gyroscopes, magnetometers, other suitable types of sensors that detect motion, sensors used for error correction of the IMU, or some combination thereof.

In some examples, the augmented-reality system 1100 may also include a microphone array with a plurality of acoustic transducers 1120(A)-1120(J), referred to collectively as acoustic transducers 1120. The acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on the frame 1110, and/or acoustic transducers 1120(I) and 1120(J), which may be positioned on a corresponding neckband 1105.

In some embodiments, one or more of the acoustic transducers 1120(A)-(J) may be used as output transducers (e.g., speakers). For example, the acoustic transducers 1120(A) and/or 1120(B) may be earbuds or any other suitable type of headphone or speaker.

The configuration of the acoustic transducers 1120 of the microphone array may vary. While the augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on the frame 1110, an orientation associated with each acoustic transducer 1120, or some combination thereof.

The acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to the acoustic transducers 1120 inside the ear canal. Having an acoustic transducer 1120 positioned next to an ear canal of a user may enable the microphone array to collect information on how sounds arrive at the ear canal. By positioning at least two of the acoustic transducers 1120 on either side of a user's head (e.g., as binaural microphones), the augmented-reality system 1100 may simulate binaural hearing and capture a 3D stereo sound field around about a user's head. In some embodiments, the acoustic transducers 1120(A) and 1120(B) may be connected to the augmented-reality system 1100 via a wired connection 1130, and in other embodiments the acoustic transducers 1120(A) and 1120(B) may be connected to the augmented-reality system 1100 via a wireless connection (e.g., a BLUETOOTH connection). In still other embodiments, the acoustic transducers 1120(A) and 1120(B) may not be used at all in conjunction with the augmented-reality system 1100.

The acoustic transducers 1120 on the frame 1110 may be positioned in a variety of different ways, including along the length of the temples, across the bridge, above or below the display devices 1115(A) and 1115(B), or some combination thereof. The acoustic transducers 1120 may also be oriented such that the microphone array is able to detect sounds in a wide range of directions surrounding the user wearing the augmented-reality system 1100. In some embodiments, an optimization process may be performed during manufacturing of the augmented-reality system 1100 to determine relative positioning of each acoustic transducer 1120 in the microphone array.

In some examples, the augmented-reality system 1100 may include or be connected to an external device (e.g., a paired device), such as the neckband 1105. The neckband 1105 generally represents any type or form of paired device. Thus, the following discussion of the neckband 1105 may also apply to various other paired devices, such as charging cases, smart watches, smart phones, wrist bands, other wearable devices, hand-held controllers, tablet computers, laptop computers, other external compute devices, etc.

As shown, the neckband 1105 may be coupled to the eyewear device 1102 via one or more connectors. The connectors may be wired or wireless and may include electrical and/or non-electrical (e.g., structural) components. In some cases, the eyewear device 1102 and neckband 1105 may operate independently without any wired or wireless connection between them. While FIG. 11 illustrates the components of the eyewear device 1102 and neckband 1105 in example locations on the eyewear device 1102 and neckband 1105, the components may be located elsewhere and/or distributed differently on the eyewear device 1102 and/or neckband 1105. In some embodiments, the components of the eyewear device 1102 and neckband 1105 may be located on one or more additional peripheral devices paired with the eyewear device 1102, the neckband 1105, or some combination thereof.

Pairing external devices, such as the neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1100 may be provided by a paired device or shared between a paired device and an eyewear device, thus reducing the weight, heat profile, and form factor of the eyewear device overall while still retaining desired functionality. For example, the neckband 1105 may allow components that would otherwise be included on an eyewear device to be included in the neckband 1105 since users may tolerate a heavier weight load on their shoulders than they would tolerate on their heads. The neckband 1105 may also have a larger surface area over which to diffuse and disperse heat to the ambient environment. Thus, the neckband 1105 may allow for greater battery and computation capacity than might otherwise have been possible on a stand-alone eyewear device. Since weight carried in the neckband 1105 may be less invasive to a user than weight carried in the eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1105 may be communicatively coupled with the eyewear device 1102 and/or to other devices. These other devices may provide certain functions (e.g., tracking, localizing, depth mapping, processing, storage, etc.) to the augmented-reality system 1100. In the embodiment of FIG. 11, the neckband 1105 may include two acoustic transducers (e.g., 1120(I) and 1120(J)) that are part of the microphone array (or potentially form their own microphone subarray). The neckband 1105 may also include a controller 1125 and a power source 1135.

The acoustic transducers 1120(I) and 1120(J) of the neckband 1105 may be configured to detect sound and convert the detected sound into an electronic format (analog or digital). In the embodiment of FIG. 11, the acoustic transducers 1120(I) and 1120(J) may be positioned on the neckband 1105, thereby increasing the distance between the neckband acoustic transducers 1120(I) and 1120(J) and other acoustic transducers 1120 positioned on the eyewear device 1102. In some cases, increasing the distance between the acoustic transducers 1120 of the microphone array may improve the accuracy of beamforming performed via the microphone array. For example, if a sound is detected by the acoustic transducers 1120(C) and 1120(D) and the distance between the acoustic transducers 1120(C) and 1120(D) is greater than, e.g., the distance between the acoustic transducers 1120(D) and 1120(E), the determined source location of the detected sound may be more accurate than if the sound had been detected by the acoustic transducers 1120(D) and 1120(E).

The controller 1125 of the neckband 1105 may process information generated by the sensors on the neckband 1105 and/or the augmented-reality system 1100. For example, the controller 1125 may process information from the microphone array that describes sounds detected by the microphone array. For each detected sound, the controller 1125 may perform a direction-of-arrival (DOA) estimation to estimate a direction from which the detected sound arrived at the microphone array. As the microphone array detects sounds, the controller 1125 may populate an audio data set with the information. In embodiments in which the augmented-reality system 1100 includes an inertial measurement unit, the controller 1125 may compute all inertial and spatial calculations from the IMU located on the eyewear device 1102. A connector may convey information between the augmented-reality system 1100 and the neckband 1105 and between the augmented-reality system 1100 and the controller 1125. The information may be in the form of optical data, electrical data, wireless data, or any other transmittable data form. Moving the processing of information generated by the augmented-reality system 1100 to the neckband 1105 may reduce weight and heat in the eyewear device 1102, making it more comfortable to the user.

The power source 1135 in the neckband 1105 may provide power to the eyewear device 1102 and/or to the neckband 1105. The power source 1135 may include, without limitation, lithium-ion batteries, lithium-polymer batteries, primary lithium batteries, alkaline batteries, or any other form of power storage. In some cases, the power source 1135 may be a wired power source. Including the power source 1135 on the neckband 1105 instead of on the eyewear device 1102 may help better distribute the weight and heat generated by the power source 1135.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality system 1200 in FIG. 12, that mostly or completely covers a user's field of view. The virtual-reality system 1200 may include a front rigid body 1202 and a band 1204 shaped to fit around a user's head. The virtual-reality system 1200 may also include output audio transducers 1206(A) and 1206(B). Furthermore, while not shown in FIG. 12, the front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The following example embodiments are also included in the present disclosure.

Example 1: An optical binocular disparity detection device, the disparity detection device including: an optical combiner, including: a left input for receiving a left image into the optical combiner; a right input for receiving a right image into the optical combiner; and an output for directing the left image and the right image out of the optical combiner; and a single image sensor configured to receive and sense the left image and the right image from the output and to generate data indicative of a disparity between the left image and the right image.

Example 2: The disparity detection device of Example 1, wherein the optical combiner includes a waveguide combiner.

Example 3: The disparity detection device of Example 2, wherein the left input includes a left input grating, the right input includes a right input grating, and the output includes an output grating.

Example 4: The disparity detection device of Example 3, wherein each of the left input grating, right input grating, and output grating is selected from the group consisting of: a polarization volume hologram grating, a surface relief grating, and a volume Bragg grating.

Example 5: The disparity detection device of Example 3 or Example 4, wherein: the left input grating includes a first left input grating of a first polarization and a second left input grating of a second polarization different from the first polarization; the right input grating includes a first right input grating of the first polarization and a second right input grating of the second polarization; and the output grating includes a first output grating of the first polarization and a second output grating of the second polarization.

Example 6: The disparity detection device of any of Examples 2 through 5, wherein the waveguide combiner further includes: a left internal reflection region for transmitting the left image from the left input to the output; and a right internal reflection region for transmitting the right image from the right input to the output.

Example 7: The disparity detection device of any of Examples 2 through 6, wherein the waveguide combiner further includes an output light director on an opposing side of the waveguide combiner from the output, the output light director including at least one of a mirror or a grating.

Example 8: The disparity detection device of any of Examples 2 through 7, wherein the waveguide combiner further includes: a left light director on an opposing side of the waveguide combiner from the left input, the left light director including at least one of a mirror or a grating; and a right light director on an opposing side of the waveguide combiner form the right input, the right light director including at least one of a mirror or a grating.

Example 9: The disparity detection device of any of Examples 2 through 8, wherein the waveguide combiner further includes: a left output mirror for directing the left image toward the output; and a right output mirror for directing the right image toward the output.

Example 10: The disparity detection device of Example 9, wherein the left output mirror and the right output mirror are arranged in the shape of an X when viewed from a side.

Example 11: The disparity detection device of any of Examples 1 through 10, wherein the optical combiner includes a left prism for directing the left image from the left input to the output and a right prism for directing the right image from the right input to the output.

Example 12: The disparity detection device of any of Examples 1 through 11, further including an optical lens between the output and the single image sensor, the optical lens configured to focus light from the output for receipt by the single image sensor.

Example 13: The disparity detection device of any of Examples 1 through 12, wherein the single image sensor includes a single array of light detection pixels.

Example 14: The disparity detection device of any of Examples 1 through 13, wherein the single image sensor includes at least one of: a single charge-coupled device (CCD) sensor, or a single complementary metal-oxide-semiconductor (CMOS) sensor.

Example 15: The disparity detection device of any of Examples 1 through 14, wherein the output includes a central output centrally located between the left input and the right input.

Example 16: The disparity detection device of any of Examples 1 through 15, wherein the left input has a D-shape, the right input has a D-shape, and the output has an oval shape.

Example 17: A binocular display system, including: a left image source for displaying a left image to a user's left eye; a right image source for displaying a right image to the user's right eye; and an optical binocular disparity detection device, including: an optical combiner including a left input for receiving the left image, a right input for receiving the right image, and an output for directing the left image and the right image out of the optical combiner; and a single image sensor configured to receive and sense the left image and the right image from the output and to generate data indicative of a disparity between the left image and the right image.

Example 18: The binocular display system of Example 17, wherein the left image source includes a left projector and the right image source includes a right projector.

Example 19: A method of fabricating an optical binocular disparity detection device, the method including: forming an optical combiner to include a left input for receiving a left image, a right input for receiving a right image, and an output for directing the left image and the right image out of the optical combiner; and coupling a single image sensor to the optical combiner to receive and sense the left image and the right image from the output.

Example 20: The method of Example 19, wherein forming the optical combiner to include the left input, the right input, and the output includes forming a waveguide combiner to include a left input grating, a right input grating, and a central output grating.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. An optical binocular disparity detection device, the disparity detection device comprising:
- an optical combiner, including:
  - a left input configured to receive a left image into the optical combiner;
  - a right input configured to receive a right image into the optical combiner;
  - an output grating configured to direct the left image and the right image external to the optical combiner and towards a single image sensor, the output grating being positioned on a first surface of the optical combiner; and
  - an output director positioned on a second surface of the optical combiner opposite the first surface and configured to direct each of the left image and the right image towards the output grating; and
- the single image sensor that is configured to:
  - receive and sense the left image and the right image from the output grating, and
  - generate data indicative of a disparity between the left image and the right image.

2. The disparity detection device of claim 1, wherein the optical combiner comprises a waveguide combiner.

3. The disparity detection device of claim 2, wherein the left input comprises a left input grating and the right input comprises a right input grating.

4. The disparity detection device of claim 3, wherein each of the left input grating, right input grating, and the output grating is selected from the group consisting of: a polarization volume hologram grating, a surface relief grating, and a volume Bragg grating.

5. The disparity detection device of claim 3, wherein:
- the left input grating comprises a first left input grating of a first polarization and a second left input grating of a second polarization different from the first polarization;
- the right input grating comprises a first right input grating of the first polarization and a second right input grating of the second polarization; and
- the output grating comprises a first output grating of the first polarization and a second output grating of the second polarization.

6. The disparity detection device of claim 2, wherein the waveguide combiner further comprises:
- a left internal reflection region for transmitting the left image from the left input to the output grating; and
- a right internal reflection region for transmitting the right image from the right input to the output grating.

7. The disparity detection device of claim 2, wherein the waveguide combiner further comprises an output light director on an opposing side of the waveguide combiner from the output grating, the output light director comprising at least one of a mirror or an additional grating.

8. The disparity detection device of claim 2, wherein the waveguide combiner further comprises:
- a left light director on an opposing side of the waveguide combiner from the left input, the left light director comprising at least one of a mirror or a grating; and
- a right light director on an opposing side of the waveguide combiner from the right input, the right light director comprising at least one of a mirror or a grating.

9. The disparity detection device of claim 2, wherein the waveguide combiner further comprises:
- a left output mirror for directing the left image toward the output grating; and
- a right output mirror for directing the right image toward the output grating.

10. The disparity detection device of claim 9, wherein the left output mirror and the right output mirror are arranged in a shape of an X when viewed from a side.

11. The disparity detection device of claim 1, wherein the optical combiner includes a left prism for directing the left image from the left input to the output grating and a right prism for directing the right image from the right input to the output grating.

12. The disparity detection device of claim 1, further comprising an optical lens between the output grating and the single image sensor, the optical lens configured to focus light from the output grating for receipt by the single image sensor.

13. The disparity detection device of claim 1, wherein the single image sensor comprises a single array of light detection pixels.

14. The disparity detection device of claim 1, wherein the single image sensor comprises at least one of:
- a single charge-coupled device (CCD) sensor, or
- a single complementary metal-oxide-semiconductor (CMOS) sensor.

15. The disparity detection device of claim 1, wherein the output grating is centrally located between the left input and the right input.

16. The disparity detection device of claim 1, wherein the left input has a D-shape, the right input has a D-shape, and the output grating has an oval shape.

17. A binocular display system, comprising:
- a left image source configured to display a left image to a user's left eye;
- a right image source configured to display a right image to the user's right eye; and
- an optical binocular disparity detection device, comprising:
  - an optical combiner including:
    - a left input configured to receive the left image,
    - a right input configured to receive the right image, and an output grating configured to direct the left image and the right image out of the optical combiner and towards a single image sensor, the output grating being positioned on a first surface of the optical combiner, and an optical director positioned on a second surface of the optical combiner opposite the first surface and configured to direct each of the left image and the right image towards the output grating; and the single image sensor configured to:

receive and sense the left image and the right image from the output grating, and generate data indicative of a disparity between the left image and the right image.

18. The binocular display system of claim 17, wherein the left image source comprises a left projector and the right image source comprises a right projector.

19. A method of fabricating an optical binocular disparity detection device, the method comprising:

forming an optical combiner to include;

a left input configured to receive a left image, a right input configured to receive a right image, an output grating configured to direct the left image and the right image out of the optical combiner and towards a single image, the output grating being positioned on a first surface of the optical combiner, and an output director positioned on a second surface of the optical combiner opposite the first surface and configured to direct each of the left image and the right image towards the output grating; and coupling a single image sensor to the optical combiner to receive and sense the left image and the right image from the output grating.

20. The method of claim 19, wherein forming the optical combiner to include the left input, the right input, and the output grating comprises forming a waveguide combiner to include a left input grating, a right input grating, and the output grating being located centrally in the optical combiner.

* * * * *